(12) United States Patent
Chandhok et al.

(10) Patent No.: US 7,483,926 B2
(45) Date of Patent: Jan. 27, 2009

(54) PRODUCTION SERVER TO DATA PROTECTION SERVER MAPPING

(75) Inventors: Nikhil Vijay Chandhok, Seattle, WA (US); Michael L. Michael, Kirkland, WA (US); Robert M. Fries, Kirkland, WA (US); Ran Kalach, Bellevue, WA (US); Paul Brandon Luber, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 695 days.

(21) Appl. No.: 11/097,062

(22) Filed: Apr. 1, 2005

(65) Prior Publication Data

US 2006/0224642 A1  Oct. 5, 2006

(51) Int. Cl.
*G06F 17/30* (2006.01)
(52) U.S. Cl. .......................... 707/204; 707/1; 707/203; 714/5; 711/162; 711/165; 709/217
(58) Field of Classification Search .................. 707/1, 707/5, 203, 204; 714/5; 711/162, 165; 709/217
See application file for complete search history.

(56) References Cited

U.S. PATENT DOCUMENTS

| | | | | |
|---|---|---|---|---|
| 5,907,672 A | * | 5/1999 | Matze et al. | 714/8 |
| 6,023,709 A | * | 2/2000 | Anglin et al. | 707/204 |
| 6,513,101 B1 | * | 1/2003 | Fisher et al. | 711/159 |
| 6,631,477 B1 | * | 10/2003 | LeCrone et al. | 714/5 |
| 6,785,786 B1 | * | 8/2004 | Gold et al. | 711/162 |
| 2002/0002661 A1 | * | 1/2002 | Blumenau et al. | 711/165 |
| 2003/0005235 A1 | | 1/2003 | Young | |
| 2003/0126107 A1 | * | 7/2003 | Yamagami | 707/1 |
| 2003/0126327 A1 | * | 7/2003 | Pesola et al. | 710/74 |
| 2003/0229645 A1 | * | 12/2003 | Mogi et al. | 707/102 |
| 2004/0010563 A1 | * | 1/2004 | Forte et al. | 709/215 |
| 2004/0230787 A1 | * | 11/2004 | Blumenau et al. | 713/1 |
| 2004/0250033 A1 | | 12/2004 | Prahlad et al. | |
| 2005/0235107 A1 | * | 10/2005 | Ohno et al. | 711/112 |
| 2005/0256999 A1 | * | 11/2005 | Kishi et al. | 711/111 |
| 2006/0174080 A1 | * | 8/2006 | Kern | 711/165 |

* cited by examiner

*Primary Examiner*—Hosain T Alam
*Assistant Examiner*—Syling Yen
(74) *Attorney, Agent, or Firm*—Workman Nydegger

(57) ABSTRACT

A method and system for backing up and restoring data of production servers. A mapping that maps volumes of production servers to volumes of a data protection server is maintained on the data protection server. When volumes of the data protection server are backed up, the mapping may be stored on the archive media together with the data of the volumes. Later, during a restore, the mapping is read from the archive media. The mapping allows the data to be restored to the data protection server or directly to the production servers.

18 Claims, 11 Drawing Sheets

PRODUCTION SERVER TO DATA PROTECTION SERVER MAPPING

FIELD OF THE INVENTION

The invention relates generally to computers, and more particularly to backups and restores of data.

BACKGROUND

A production server needs to have little if no down time. At the same time, however, the data on a production server is often critical to an organization and needs to be backed up frequently in case the production server loses or has its data corrupted. To alleviate this problem, data on a production server may be exported to data protection server. As the data on the production server changes, deltas corresponding to the changes may be sent to the data protection server. Periodically, the data from the production server that is stored on the data protection server may be backed up, thus avoiding down time for backups of the production server.

Restoring data from datasets created by the backups may be problematic, particularly if the data protection server loses or has its data corrupted. What is needed is a method and system for backing up and restoring data so as to minimize downtime of production servers. Ideally, such a method and system would also provide a mechanism for a system administrator or the like to restore data backed up from the data protection server either to the data protection server or directly to the production server.

SUMMARY

Briefly, the present invention provides a method and system for backing up and restoring data of production servers. A mapping that maps volumes of production servers to volumes of a data protection server is maintained on the data protection server. When volumes of the data protection server are backed up, the mapping may be stored on the archive media together with the data of the volumes. Later, during a restore, the mapping is read from the archive media. The mapping allows the data to be restored to the data protection server or directly to the production servers.

Other aspects will become apparent from the following detailed description when taken in conjunction with the drawings, in which:

DETAILED DESCRIPTION

Exemplary Operating Environment

Figure 1:
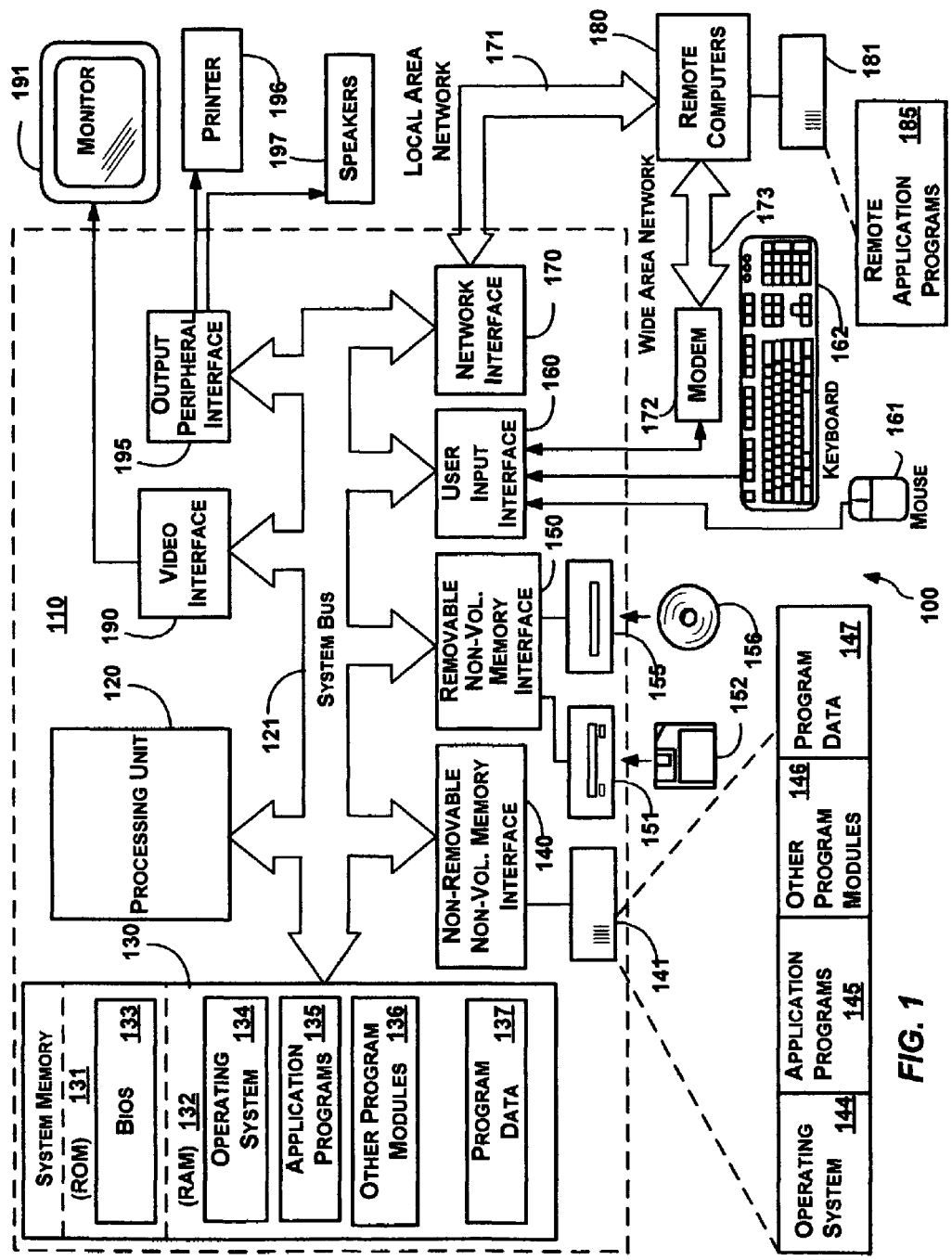
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Backups and Restores

Figure 2:
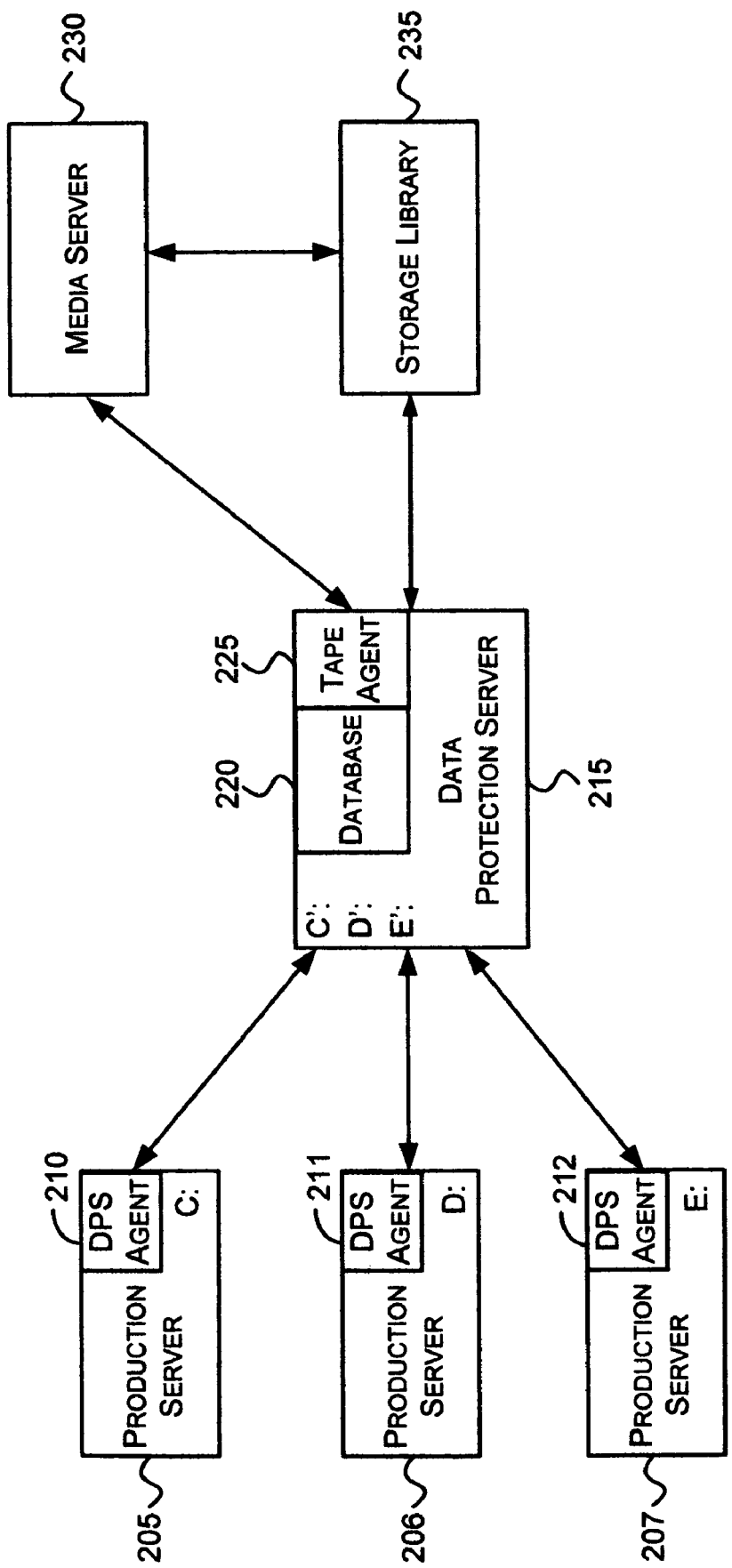
FIG. 2 is a block diagram representing an exemplary environment in which the present invention may operate in accordance with various aspects of the invention.

FIG. 2 is a block diagram representing an exemplary environment in which the present invention may operate in accordance with various aspects of the invention. The environment includes production servers 205-207, a data protection server (DPS) 215, a media server 230, and a storage library 235. The production servers 205-207 include DPS agents 210-212, respectively. The data protection server 215 includes a database 220, and a tape agent 225. There may be more or fewer production servers without departing from the spirit or scope of the present invention.

The production servers 205-207 are devices such as the computer 110 of FIG. 1. Most frequently, production servers need to be highly available and may store and modify a working set of data used by an enterprise. One example of a production server is a Web server that hosts publicly accessible Web pages for an organization. The organization may look bad if the Web server becomes unavailable or loses any of its data. Another example of a production server is an e-mail server that stores and transmits e-mails for a company's employees. Halting an e-mail server for any significant period of time may greatly reduce the productivity of an entire company. Another example of a production server is a file server that stores and provides access to documents and data for an organization.

Although in some embodiments, a production server is highly available (e.g., is not offline much), in other embodiments, this is not a requirement. For example, although unusual, a mobile computer may be used as a production server. Such a production server may be frequently connected and disconnected from a network connecting the production server to other computers that store and access data on the production server. Indeed, although references are made herein to a production server, any computing device capable of storing data may be backed up and restored similarly to a production server as described herein without departing from the spirit or scope of the present invention. Thus, a production server may comprise any computing device and may store data other than or in addition to enterprise data.

The data protection server 215 is any device (e.g., the computer 110 of FIG. 1) that stores a copy of any data stored on one or more production servers. The data protection server 215 may obtain data from the production server 205-206 through DPS agents 210-212. The data protection server 215 may install the DPS agents 210-212 on the production servers 205-207 if needed. The DPS agents 210-212 may be implemented as file system filters that monitor changes to specified volumes on the production servers 205-207. When a file is added, modified, or deleted, a DPS agent may store information regarding the addition, modification, or deletion in a log file. Shortly thereafter, or periodically, the DPS agent may send information from the log file to the data protection server 215. This log file can be applied on the data protection server to create a duplicate of the volumes on the production server.

Periodically, the data protection server 215 may create a shadow copy of each volume used to store data from the production servers 205-207. A shadow copy is a "snapshot" of a volume. Logically, a shadow copy is an exact duplicate of a volume at a given point in time, even though the volume may not be entirely copied (e.g., via copy-on-write) in creating the shadow copy. A shadow copy may be viewed as a separate volume by the operating system and any executing applications. For example, a shadow copy may have a volume device, a volume name, a drive letter, a mount point, and any other attribute of an actual volume. In addition, a shadow copy may be exposed through a network remote path such as a network share (sometimes referred to simply as a "share") associated with it that allows access from a network to a portion or all of the data contained within the shadow copy.

A shadow copy may be created by various well-known techniques, including copy-on-write, split mirror, specialized hardware that creates a copy of the disk itself, and other methods and systems known to those skilled in the art.

Periodically, the storage on the data protection server 215 may become full or need to have data thereon moved off-site for regulatory purposes, to protect from disaster, or for other reasons. To archive data contained on the data protection server 215, shadow copies contained on the data protection server 215 may be used to backup data contained on the production server 215 to a storage library such as storage library 235.

The data contained on the data protection server 215 may be archived to the storage library 235 so that it may be easily restored to the data protection server 210 and/or to the production servers 205-207. In one embodiment, the data is archived to the storage library 235 in a manner so as to appear as to have come directly from the production servers 207. For example, if a volume (e.g., C) on production server 205 is mapped to a volume (e.g., C') on the data protection server 215, when archiving C', the data is archived with C inserted wherever C' appears. Note that the volume letters specified above are exemplary and are meant to indicate an identifier of a volume. Some volumes may not be assigned volume letters and may not be directly accessible to non-OS components. Such volumes, however, will generally be represented by identifiers (e.g., volume GUIDs or hardware abstraction layer identifiers such as multi(0)disk(0)rdisk(0)partition(1)) which may be used to access the volumes.

In another embodiment, the data is archived to the storage library 235 to appear to have come from the data protection server 215. In either embodiment, mappings of the production server volumes to corresponding data protection server volumes may also be stored when archiving data to the storage library 235. The mappings may be represented as tuples in a table including the production server name and volume and its corresponding data protection server and volume name or other volume identifier. For example, the mappings \\PS1\C: ->\\DS\C':, \\PS2\D: ->\\DS\D':, and \\PS3\E: ->\\DS\E': (where PSX indicates a name of one of the production servers 205-207 and DS indicates a name of the data protection server 215) may be stored on the storage library 235 whenever the C', D' and E' volumes are archived to the storage library 235. Such mappings may be maintained in the database 220. Storing these mappings makes it possible to restore the volumes to the data protection server 215 or to the production servers 205-207 as desired as will be described in more detail below.

The storage library 235 comprises storage into which data from data protection server 215 may be archived. The storage library 235 may include tapes, CDs, DVDs, hard drives, optical devices, any other storage media, or any combination thereof. The storage library may be directly attached to the data protection server 215 or may be reachable over a network.

The media server 230 may interact with the data protection server 215 (e.g., through the tape agent 225) and the storage library to backup data on the data protection server 215. A user may manage backups via the media server 230.

In some embodiments, the media server 230 and the storage library 235 reside on the same device. In some embodiments, the media server 230 and the storage library 235 reside on the data protection server 215.

Figure 3:
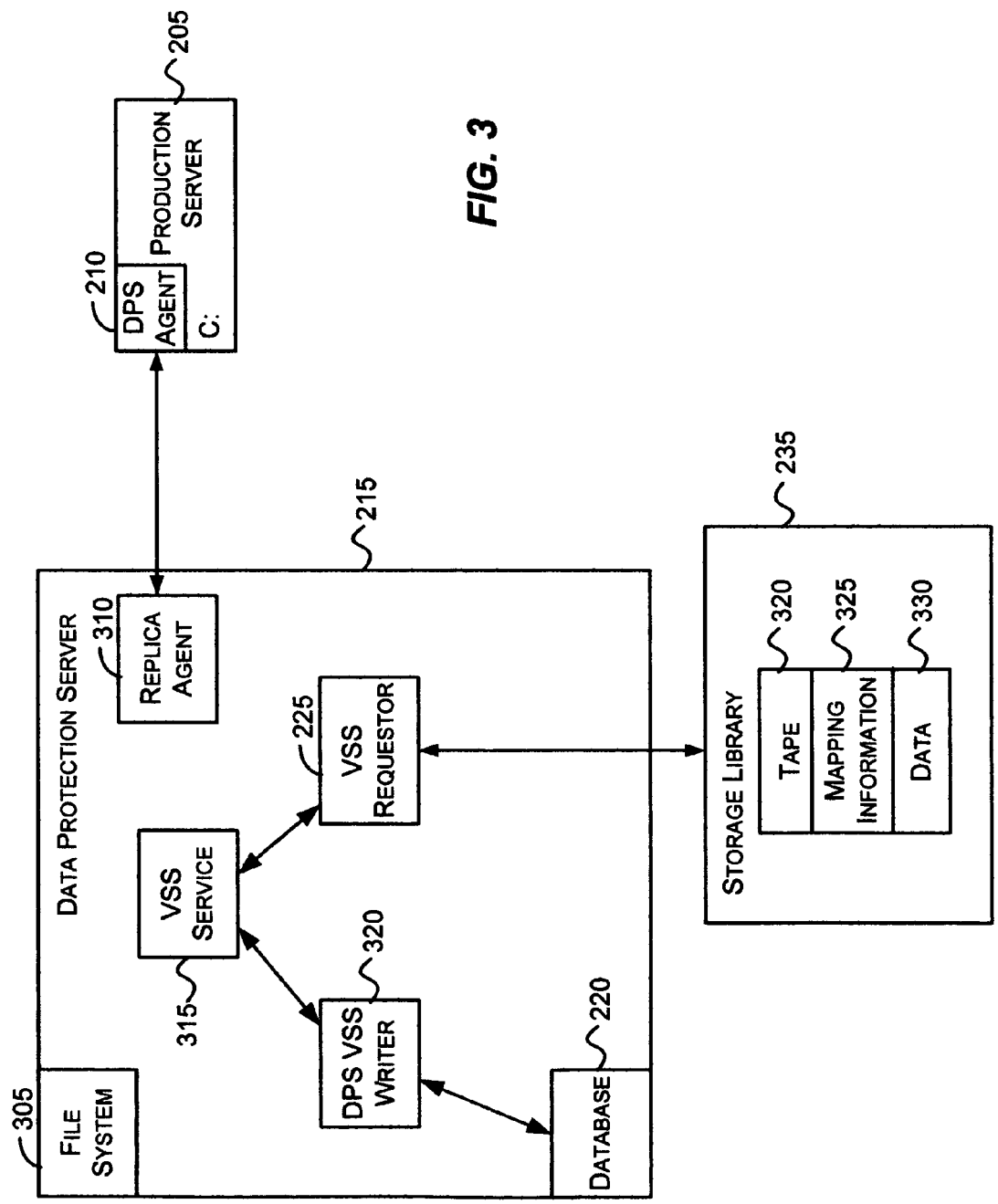
FIG. 3 is a block diagram representing another exemplary environment in which the present invention may operate in accordance with various aspects of the invention.

FIG. 3 is a block diagram representing another exemplary environment in which the present invention may operate in accordance with various aspects of the invention. In the block diagram, exemplary components of the data protection server 215 and the storage library 235 are shown. The data protection server may include a file system 305, a replica agent 310, a volume shadow copy (VSS) service 315, a DPS volume shadow copy service (VSS) writer 320, a VSS requester 225, and a database 220.

In operation, the VSS requester 225 communicates with the VSS service 315 to ask what writers exist on the data protection server 215. In response, the VSS service 315 provides a list of writers to the VSS requester 225. The writers may include the DPS VSS writer 320, a writer for the system state, a writer for each SQL or other database, and the like.

Each writer is associated with an application that executes on the data protection server 215 that has data that needs to be backed up. Each writer, including the DPS VSS writer 320, ensures that at the time a shadow copy is created what is on disk is crash consistent as far as its associated application is concerned. A writer may or may not flush pending writes to disk in preparation for creating a shadow copy. The behavior of a writer may depend on the application with which the writer is associated. A writer may also provide information to a backup application as to how to backup and restore the data. The writer may tell the backup application where the application's data resides and what files contain the application's data.

After obtaining a list of writers from the VSS service 315, the VSS requestor 225 determines which writers it wishes to involve in a shadow copy and which components (reported by the writers) it wishes to include in the backup set. Then, based on the selected component list, the VSS requestor 225 tells the VSS Service 315 which volumes to add to the shadow copy set.

When the DPS VSS writer 320 is present, the selected component list will also include all the physical replica volumes that reside on the data protection server 215. These volumes contain the data that was replicated from any production servers.

In determining what volumes need to be backed up for data from production servers, the DPS VSS writer 320 queries the database 220. From the mappings included in the DPS configuration database 220, the DPS VSS writer 320 identifies a list of all protected objects from all the production servers. This list may include all folders, volumes, and shares from all the production servers that an administrator chose to protect and replicate to the data protection server 215.

Then, the DPS VSS writer 320 may group all these protected objects according to the actual physical volumes that they reside under on each corresponding production server. Each volume (which may or may not have a drive letter because it may comprise a mount point) may be mapped to a well-known VSS component (as defined by the VSS service 315), and all the protected objects that reside on this volume may be added as file paths under this VSS component.

The DPS VSS writer 320 may also create a document that includes these mappings of production server volumes (the VSS components) and paths to volumes and paths on the data protection server 215. In addition, the VSS requesters may need this mapping in order to perform recovery both on the data protection server 215 and on any of the production servers. Because the data protection server 215 may protect and replicate data from multiple production servers the mappings may be needed both at backup time, in order to store them in the catalog, and at recovery time, in order to restore to either the data protection server 215 or to any of the production servers.

This mappings document is exposed to the VSS requester 225 through a well known path in the DPS namespace. The VSS requestor 225 may then parse the document and the DPS writer metadata returned by VSS to determine the volumes residing on the data protection server 215 that need to be backed up for production servers. The VSS requestor 225 may then store or otherwise encode the mapping information 325 together with the data 330 in a tape 320 of the storage library 235. In one embodiment, a separate tape is used to backup volumes associated with each unique production server indicated in the mapping information 325. This may be done to make it easier to restore data directly to the production server.

It will be recognized that the method and system described above preserves more information than a typical backup of the data protection server 215. A typical backup of the data protection server 215 (without the DPS VSS writer 320 and VSS service 315) may not include a mapping that indicates what production server volumes are backed up. To obtain such a mapping, a user may need to know the way the data protection server 215 lays out files in the file system 305 and may also need to manually enumerate volumes and construct a mapping table. For example, the user may need to discover that C on production server 205 is mapped to C' on the data protection server 215, backup C' and store the mapping information for future restoration.

The VSS requester 225 then coordinates creating shadow copies of the volumes associated with these writers via the VSS service 315. After the shadow copies are created, the VSS requestor 225 may then copy the data from the shadow copies to the storage library 235.

Shown within the storage library 235 is a tape 320 including mapping information 325 and data 330. As mentioned previously, the mapping information 325 maps production server volumes to data protection server 215 volumes. These mappings may be represented, for example, as tuples in a table as described previously. In addition, the mapping information 325 may include two sections. One section may be formatted for use by VSS systems and may contain a format that should not be interpreted directly and relied upon by a non-VSS system as it may change from time to time. The section may or may not be encrypted, but even if not encrypted, the backup agent should treat this section as opaque.

The other section of the mapping information 325 may include the same mappings of production server volumes to data protection server 215 volumes, but may do so in a published, publicly-available format. This section may be more fixed in format and may provide extensibility mechanisms that may be used to extend the format, if necessary, without disrupting the functionality of existing backup agents. In general, a third party backup agent may rely on this section to obtain mapping information to restore to a non-VSS system, for example.

The above mechanism allows a vendor to have its own proprietary format for mapping volumes while providing a publicly-available format that other vendors may use to determine volume mappings. It will be recognized that this has many advantages such as allowing a vendor to frequently change its proprietary format without disrupting the functionality of existing backup agents provided by third parties.

In addition to the mapping information 325, the VSS requester 225 may also store writer and backup metadata documents on the tape 320 as these may be needed for recovery.

During a restore, when used with a VSS system, a VSS requestor 225 may pass the writer and metadata documents to the VSS service 315 and the DPS VSS writer 320. The VSS service 315 and the DPS VSS writer 320 may validate and check the integrity of the passed documents.

The replica agent 310 may be used to restore a volume to the production server 205 as its corresponding volume is being restored to the data protection server 215. Instead of requiring an administrator or tape agent to restore the volume to the data protection server 215 and then to restore the volume to the production server 205, the replica agent may duplicate a stream that is used to restore a volume on the data protection server 215 and send the duplicate stream to the production server 205. As the volume on the data protection server is restored, simultaneously, the corresponding volume on the production server 205 may be restored. The replica agent 310 may or may not be a component of a tape agent such as VSS requester 225.

In another embodiment of the invention, after data has been restored to a volume on the data protection server 310, the replica agent 310 restores the data to a corresponding volume on a production server 205.

In some embodiments, a system administrator or the like may select to restore one or more folders, files, or some other objects (generally collectively and singly referred to herein as "data" or "data of a volume") without restoring all the data of a volume. In other embodiments, the system administrator or the like may select to restore data that comprises all the folders, files, and other objects of a volume during a restore.

Figure 4:
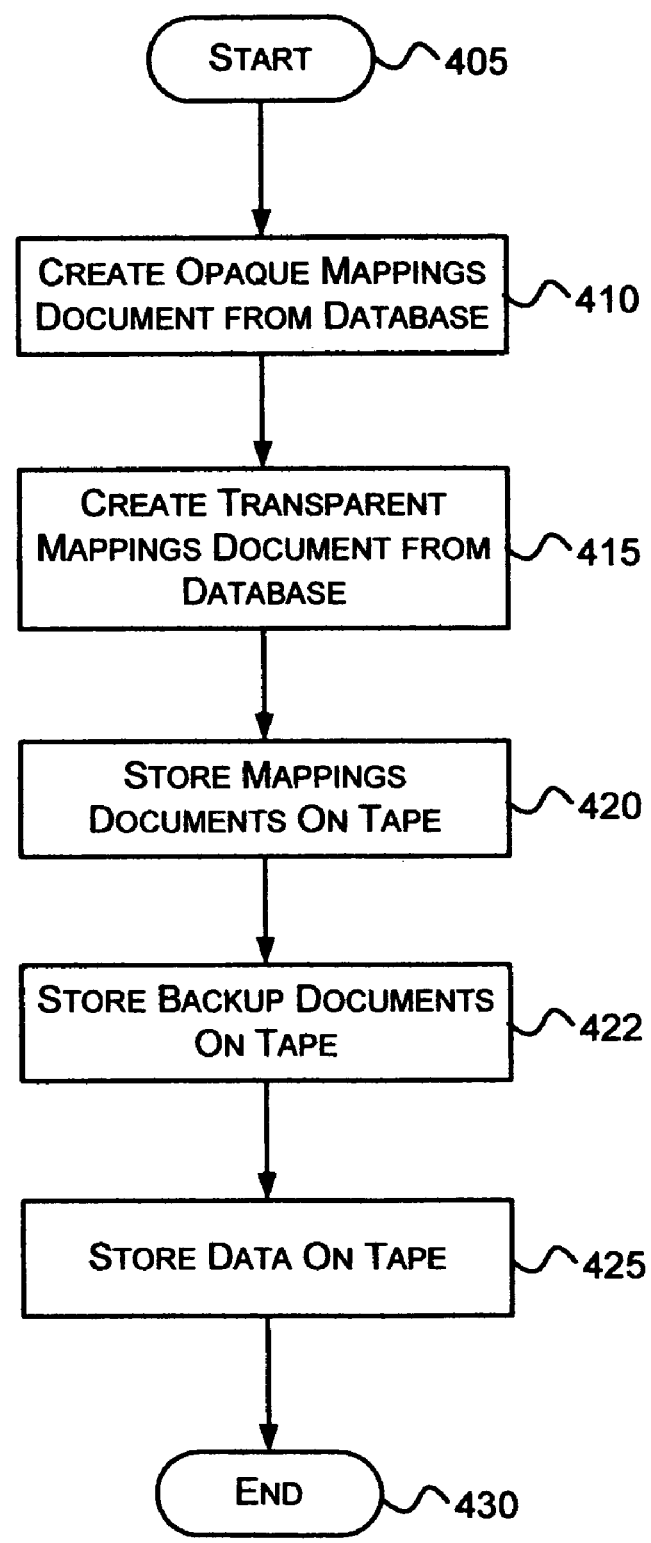
FIG. 4 is a flow diagram that generally represents actions that may occur in backing up a data protection server in accordance with various aspects of the invention.

FIG. 4 is a flow diagram that generally represents actions that may occur in backing up a data protection server in accordance with various aspects of the invention. At block 405, the actions commence.

At block 410, the opaque or proprietary format mappings are created from a database of such mappings that may be included on the data protection server. These may be created by the DPS writer 320 of FIG. 3, for example, in response to a request for volumes to backup on the data protection server 215.

At block 415, the transparent or publicly-available format mappings are created. These mappings may also be created by the DPS writer 320 of FIG. 3.

At block 420, the mappings documents are stored or encoded on tape or some other archival backup media.

At block 422, a backup document that indicates the files that are being backed up is stored on the tape. The actions associated with block 422 may occur before the actions associated with block 420. Indeed, the only order that may be enforced is to create the mappings documents (e.g., blocks 410 and 415) before storing them (e.g., block 420). The actions associated with other blocks may be performed in other orders without departing from the spirit or scope of the present invention.

At block 425, the data corresponding to the volumes is also stored on tape. This data may be obtained from shadow copies of the volumes as indicated previously. The actions associated with block 420 and 425 may be performed via a tape agent (e.g., VSS requestor 225 of FIG. 2) in conjunction with a media server (e.g., media server 230 of FIG. 2).

At block 430, the actions stop. The actions above may be repeated each time data is archived from the data protection server.

Figure 5:
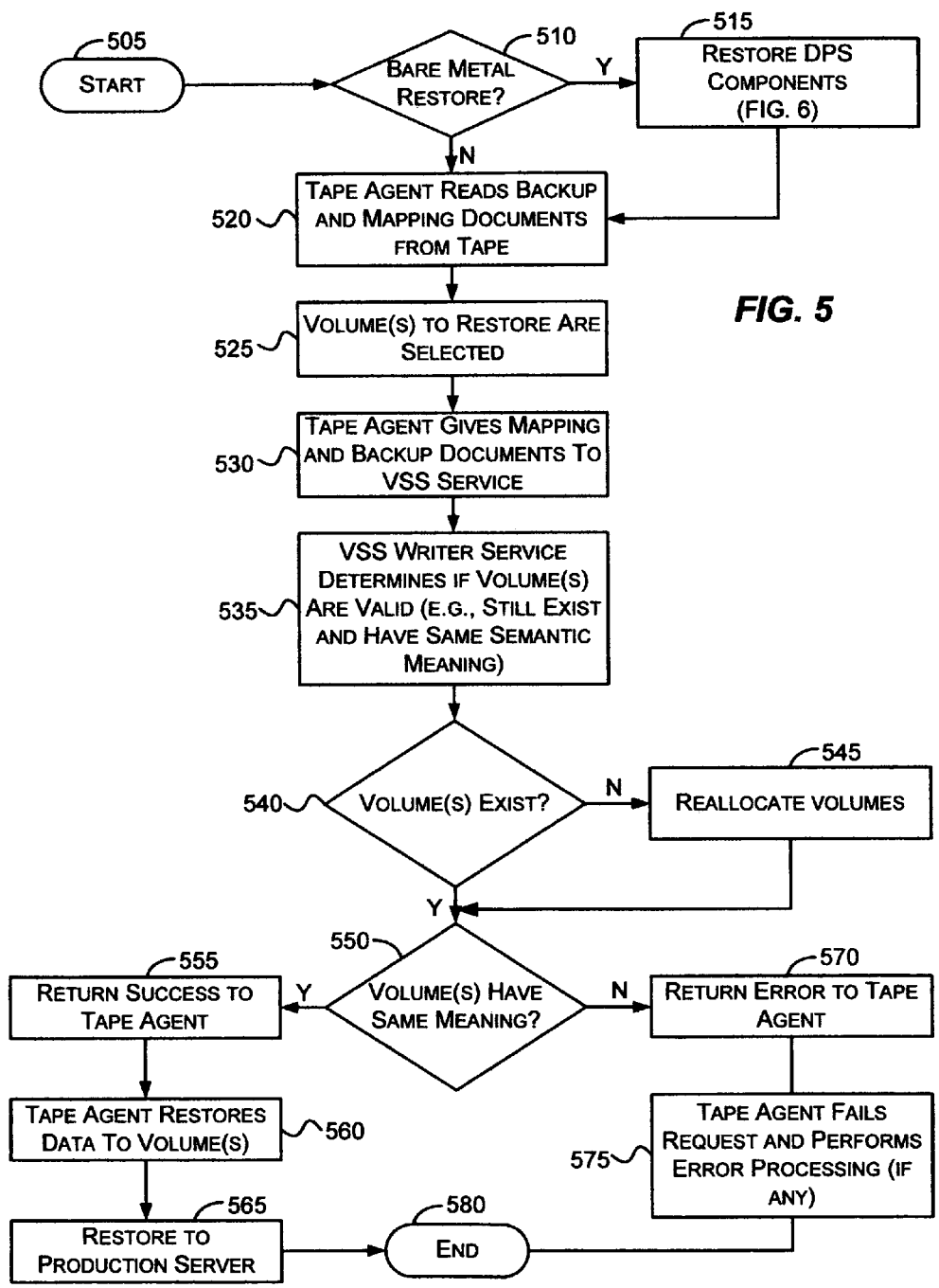
FIG. 5 is a flow diagram that generally represents actions that may occur in restoring data in accordance with various aspects of the invention.

FIG. 5 is a flow diagram that generally represents actions that may occur in restoring data in accordance with various aspects of the invention. At block 505, the actions commence.

At block 510, a determination is made as to whether the restore is to a data protection server that has crashed or had its disk corrupted or reformatted. This is sometimes referred to restoring to "bare metal" as potentially all software components and data may need to be installed on the data protection server. If so, processing branches to block 515; otherwise, processing branches to block 520.

Figure 6:
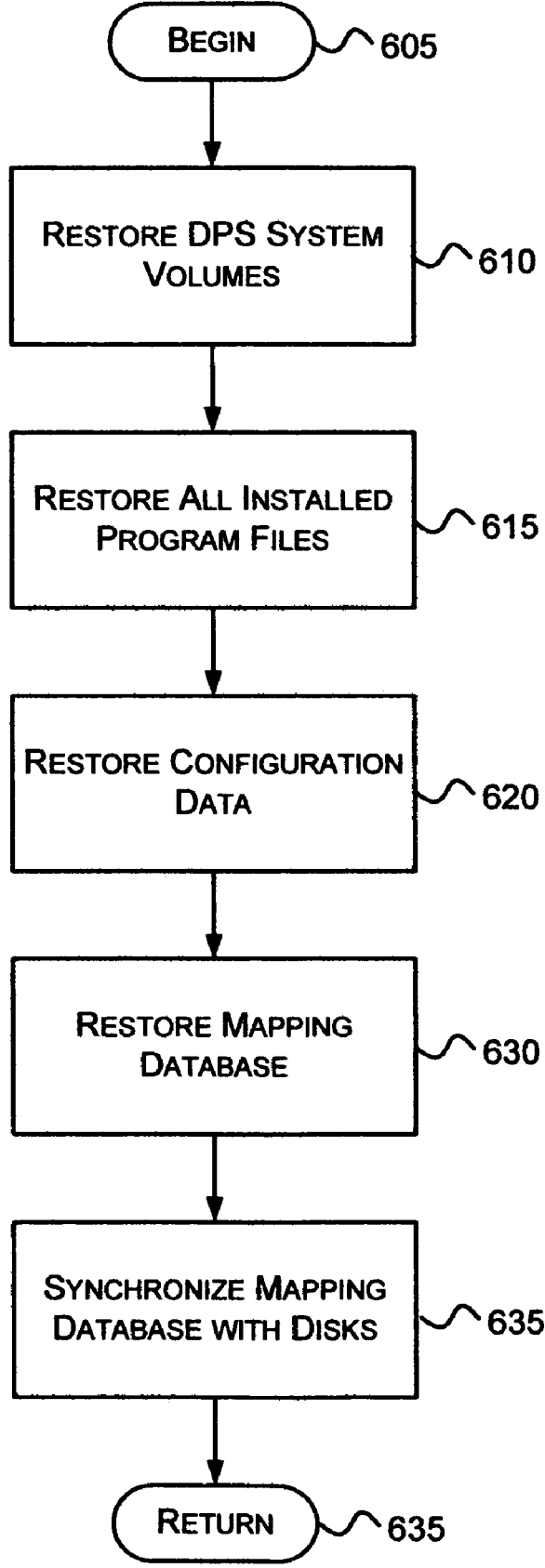
FIG. 6 is a flow diagram that generally represents actions corresponding to block 515 of FIG. 5 that may occur in restoring data in accordance with various aspects of the invention.

At block 515, data protection server components and data are restored as described in more detail in conjunction with FIG. 6. This is done to prepare the data protection server to restore the volume(s).

At block 520, the tape agent reads backup and mapping documents from the tape (or other archival media). At block 525, the volume(s) to restore are selected. The volume(s) that are available to be restored may be viewed through a user interface such as the one shown in FIG. 7, which is an exemplary user interface for viewing the structure of data that has been backed up from a data protection server in accordance with various aspects of the invention.

At block 530, the tape agent gives the mapping and backup documents to the VSS service together with the selected volumes to restore. At block 535, the DPS VSS writer service uses the mappings to determine if the volumes that the tape agent wishes to restore are still valid. Being valid implies that the volumes still exist and have the same semantic meaning in the DPS namespace. A volume has the same semantic meaning if it is currently mapped to the same production server the volume is mapped to in the mapping document.

If the volume(s) to restore still exist, at block 540, processing branches to block 550; otherwise processing branches to block 545. At block 545, because the volumes do not exist, they are reallocated. This may be done by the tape agent, another VSS component, or any other process via operating system calls. When a volume is reallocated, it may be mapped to a production server volume corresponding to one found in the mapping document.

If the volume(s) still have the same semantic meaning, at block 550, processing branches to block 555. At block 555, a successful return code is returned to the tape agent. This indicates to the tape agent that the volumes exist and have the same semantic meaning and that the tape agent may restore data to the volume(s).

At block 560, the tape agent restores the data to the volume (s). The tape agent may coordinate with a VSS service to stop writers during the restoration process. At block 565, data may also be simultaneously restored to one or more production servers.

At block 570, an error is returned to the tape agent. This indicates that at least one of the volumes does not have the same semantic meaning it had when the mapping document was created. At block 575, the tape agent fails the restore request and performs error processing, if any. If the tape agent is not able to restore all the volume(s) requested, this does not mean that no volumes may be restored. Indeed, a user may select volumes that have the same semantic meaning and cause the tape agent to restore the volumes or may delete and reallocate volumes that have had their semantic meaning changed.

At block 580, the actions end. The actions may be repeated each time data is first restored to a data protection server and then to a production server.

FIG. 6 is a flow diagram that generally represents actions corresponding to block 515 of FIG. 5 that may occur in restoring data in accordance with various aspects of the invention. At block 605, the actions begin.

At block 610, the data protection server system volumes are restored. These volumes may be recovered using an automated system restore (ASR) program or by manually configuring the volumes (e.g., via a user interacting with a tool). These volumes may contain, for example, the operating system and other components needed to execute programs on the data protection server.

At block 615, all program files previously installed on the DPS system volumes are restored to the data protection server. These files may include programs that constitute the data protection server and database server previously installed on the data protection server, for example.

At block 620, the configuration data is restored. Configuration data may include data files associated with installed program files. In one embodiment, the actions associated with block 620 are performed at the same time as the actions associated with block 615.

At block 625, the data protection server configuration database is restored. This database also includes the mappings from data protection server volumes to production server volumes. The database may be restored through a specialized tool or via a VSS writer.

At block 635, the mapping database is synchronized with disks. Synchronization determines what data protection server volumes on the data protection server need to be reallocated to map to the production server volumes indicated in the mappings database. A list of volumes to reallocate may be returned. These volumes may be reallocated after block 635 or at block 545 of FIG. 5, for example. Synchronizing the mappings database with the disks may be performed through the use of a specialized tool arranged to read the mapping database and volumes of the data protection server, for example.

Figure 7:
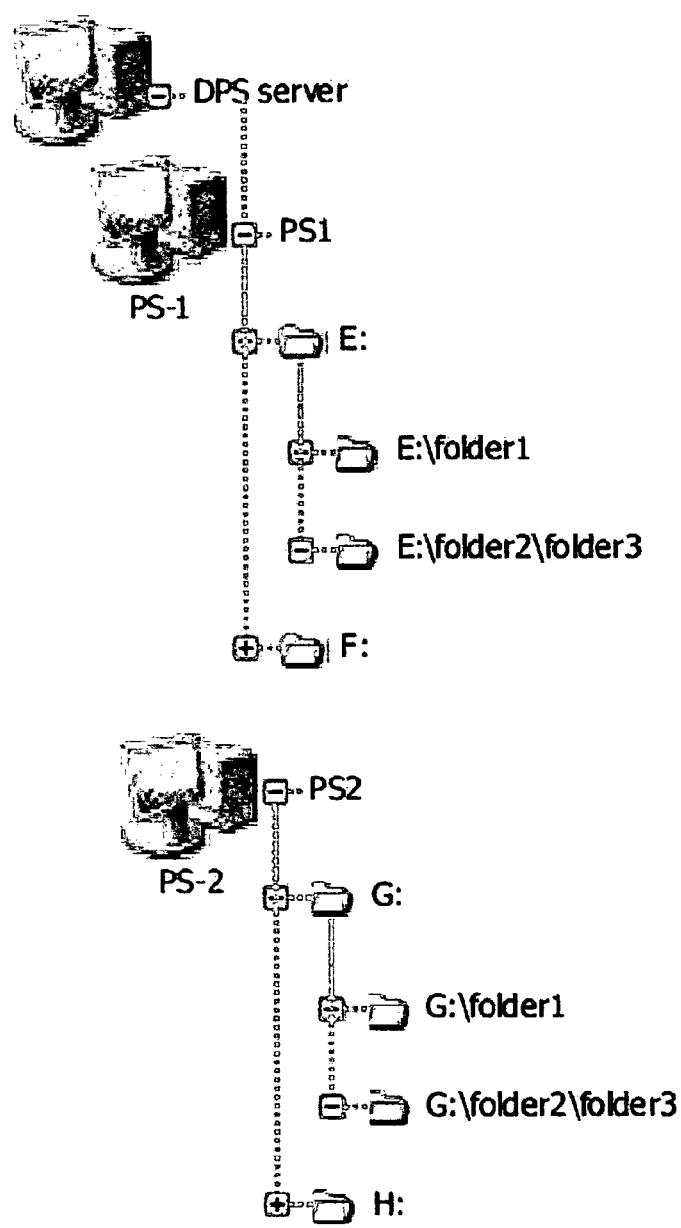
FIG. 7 is an exemplary user interface for viewing the structure of data that has been backed up from a data protection server in accordance with various aspects of the invention.

Turning to FIG. 7, a user interface 700 may display the production servers and their associated volumes that are stored on the data protection server. The user interface 700 may provide folder and/or file granularity of the volumes without departing from the spirit or scope of the present invention.

Figure 8:
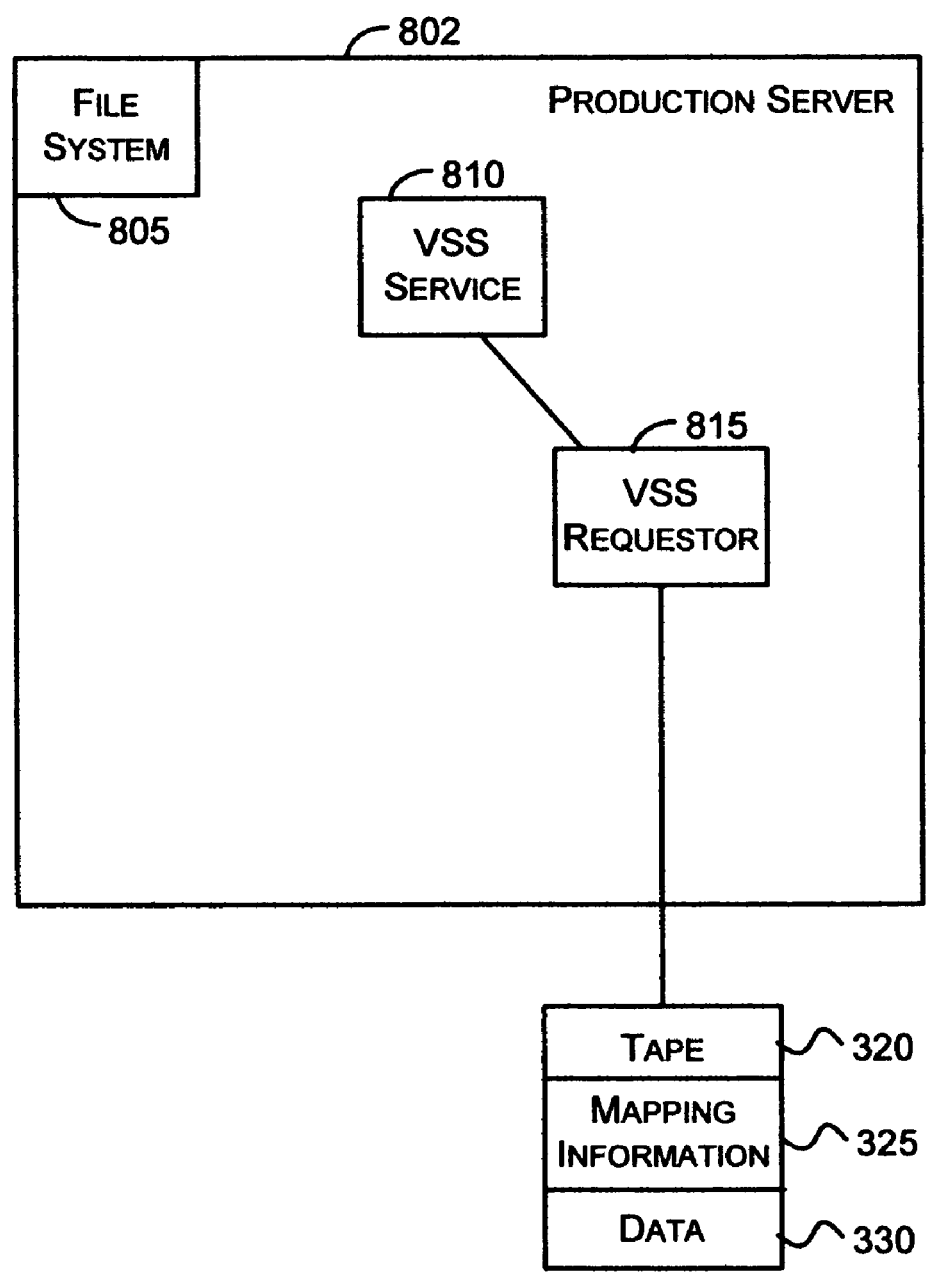
FIG. 8 is a block diagram representing a production server to which data is restored via VSS components in accordance with various aspects of the invention.

FIG. 8 is a block diagram representing a production server to which data is restored via VSS components in accordance with various aspects of the invention. The production server 802 includes a file system 805, a VSS service 810, a VSS requestor 815, may include a DPS agent 210 (if it has already been installed by a data protection server or otherwise), and may also include or be connected to a device providing access to the tape 320 which includes mapping information 325 and data 330.

The VSS requester 815 may comprise a tape agent that initiates the restore of data to the file system 805. The VSS requester 815 may read the mapping information 325 from the tape 320 and may determine which volume or volumes the data 330 on the tape 320 should be restored to. The VSS requestor 815 provides the mapping information 325 to the VSS service 810.

The VSS service 810 may interpret the backup documents provided by the tape agent and may also indicate whether the data 330 may be restored to the production server 802. In one embodiment, the VSS service 810 simply checks the integrity of the backup and writer documents (e.g., performs a checksum and validates the data). If the integrity of the documents is good, the VSS service 810 indicates that the data 330 may be restored to the production server 802.

Figure 10:
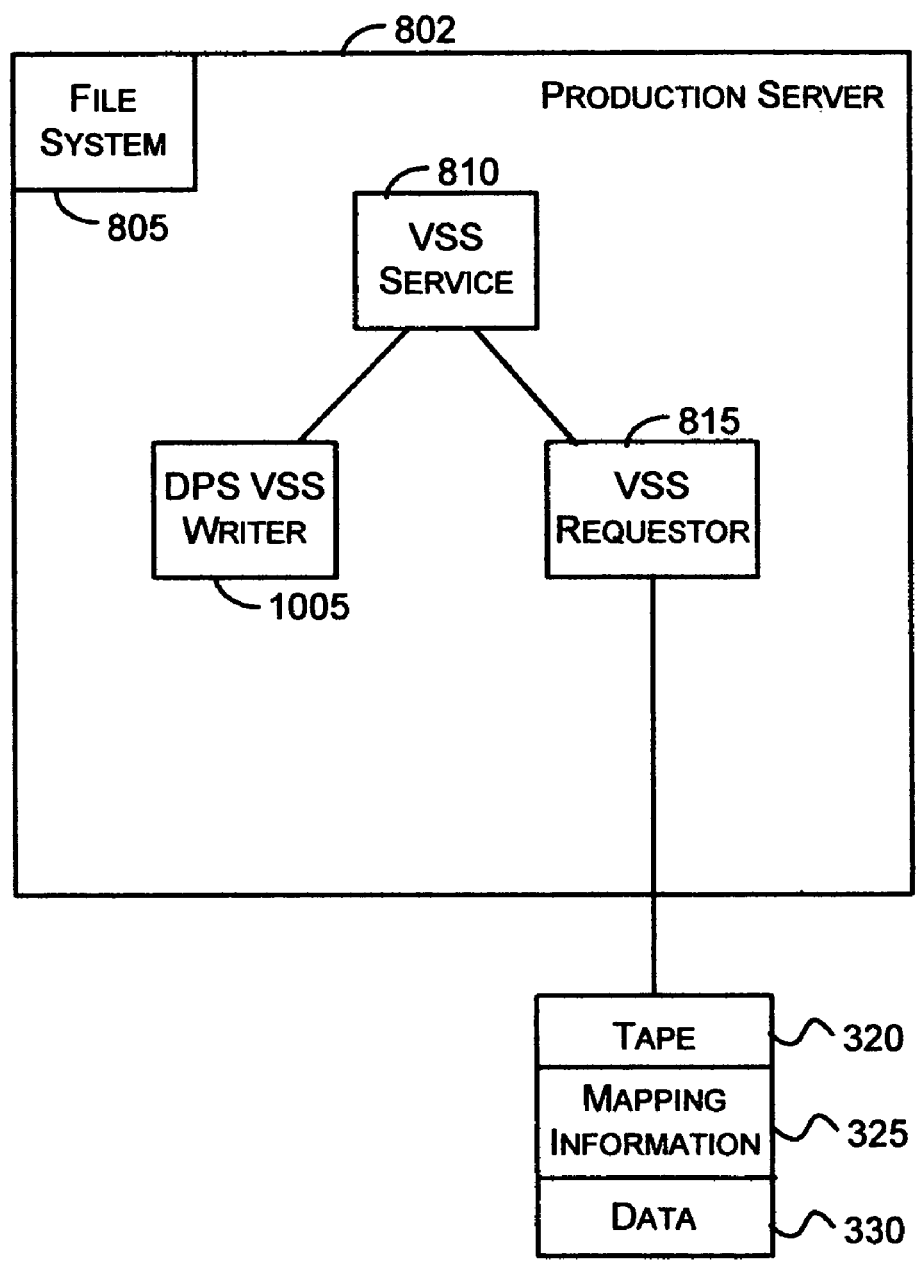
FIG. 10 is a block diagram representing a production server to which data is restored via VSS components in accordance with various aspects of the invention.

In FIG. 10, which is a block diagram representing a production server to which data is restored via VSS components in accordance with various aspects of the invention, the VSS service 810 and a DPS VSS writer 1005 may be included in the production server 802. In this embodiment, in addition to checking the integrity of the mapping document, the VSS service 810 may validate the mapping information 325 it receives from the VSS requester 815. The VSS service 810 may pass the mapping information 325 to the DPS VSS writer 1005 which may then determine from the mapping information 325 whether the volume that the VSS requester 815 wants to restore is mapped to the production server 802. If the production server name included in the mapping information 325 is not the same as the name of the production server 802, the DPS VSS writer 1005 may then determine whether the name given in the mapping information 325 is a previous name for the production server 802 (e.g., the production server 802 was renamed). If the name is not the current or a previous name of the production server 802, the DPS VSS writer 1005 may determine that the mapping information is invalid. As part of its validation, the DPS VSS writer 1005 may also check to see if the volume the VSS requester 815 wants to restore exists in the file system 805.

Turning back to FIG. 8, if the VSS service 810 indicates that the data 330 may be restored, the VSS requestor 815 may then restore the data 330. In doing so, the VSS requester 815 may need to reallocate a volume on the production server 802 before restoring the data 330. If the volume names of the data protection server's volumes are stored as a part of file names for files in the data 330, a substitution of volume names may be performed when restoring to the production server 802. For example, if the data 330 includes a file named C':\file1.txt, the volume name of the file may become C: when restoring to the file system 805. In some embodiments, the volume name may not be stored with each file stored on the data 330, so substitution of volume names may not be necessary during a restore.

Figure 9:
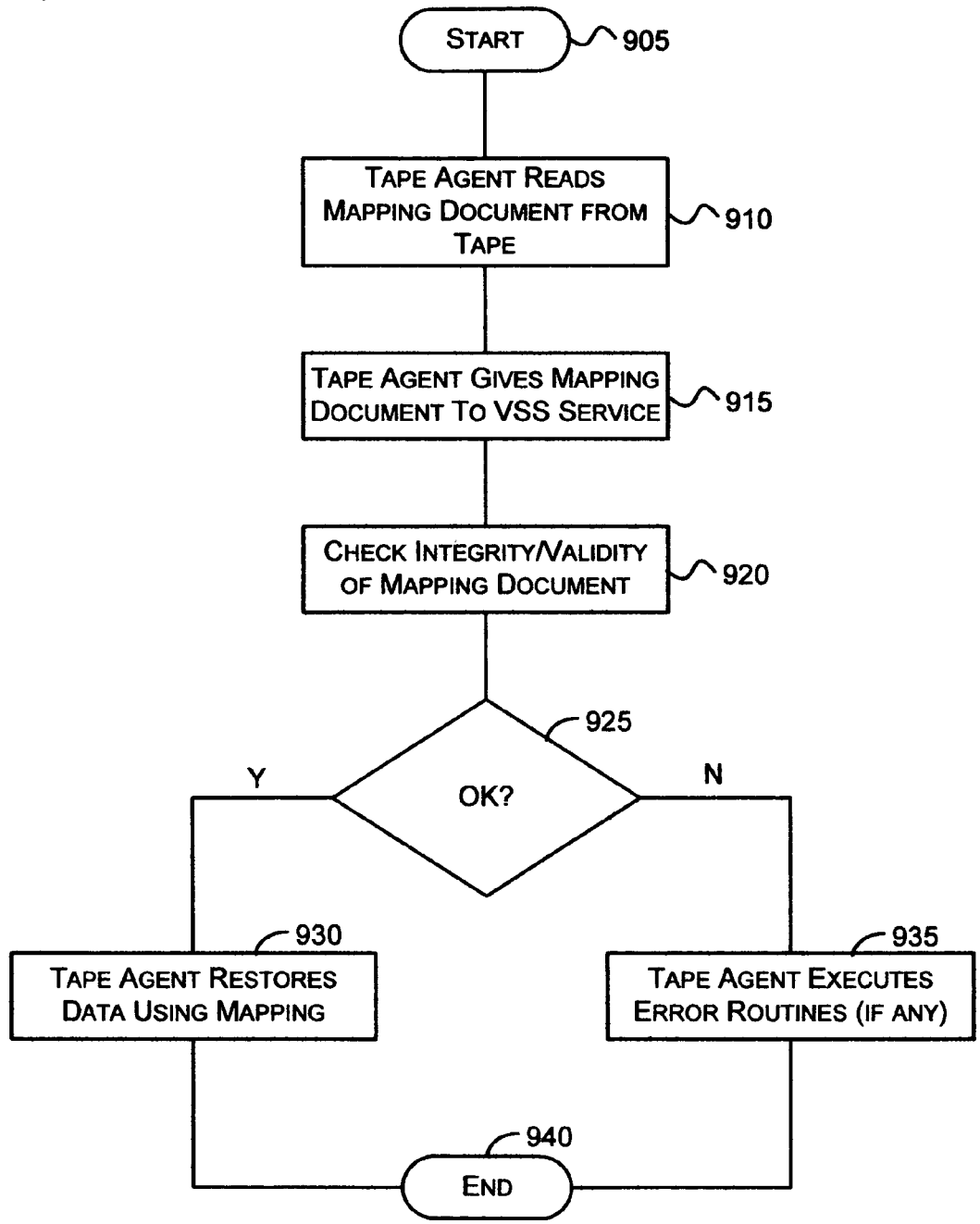
FIG. 9 is a flow diagram representing exemplary actions that may occur in restoring data to a production server in accordance with various aspects of the invention.

FIG. 9 is a flow diagram representing exemplary actions that may occur in restoring data to a production server in accordance with various aspects of the invention. At block 905, the actions start.

At block 910, the tape agent reads the mapping, backup, and metadata documents from the tape. At block 915, the tape agent then gives the backup and metadata documents to the VSS service 915. At block 920, the VSS service may simply check the integrity of the backup and metadata documents and/or may check the validity of the backup and metadata documents.

If the backup and metadata documents pass integrity and/or validity checks, at block 925, processing branches to block 930; otherwise, processing branches to block 935. At block 930, the tape agent restores the data using the mapping document. At block 935, the tape agent executes error routines (if any) in response to the metadata and/or backup documents not having integrity or being invalid.

At block 940, the actions end. The actions may be repeated each time data is restored to a production server.

Figure 11:
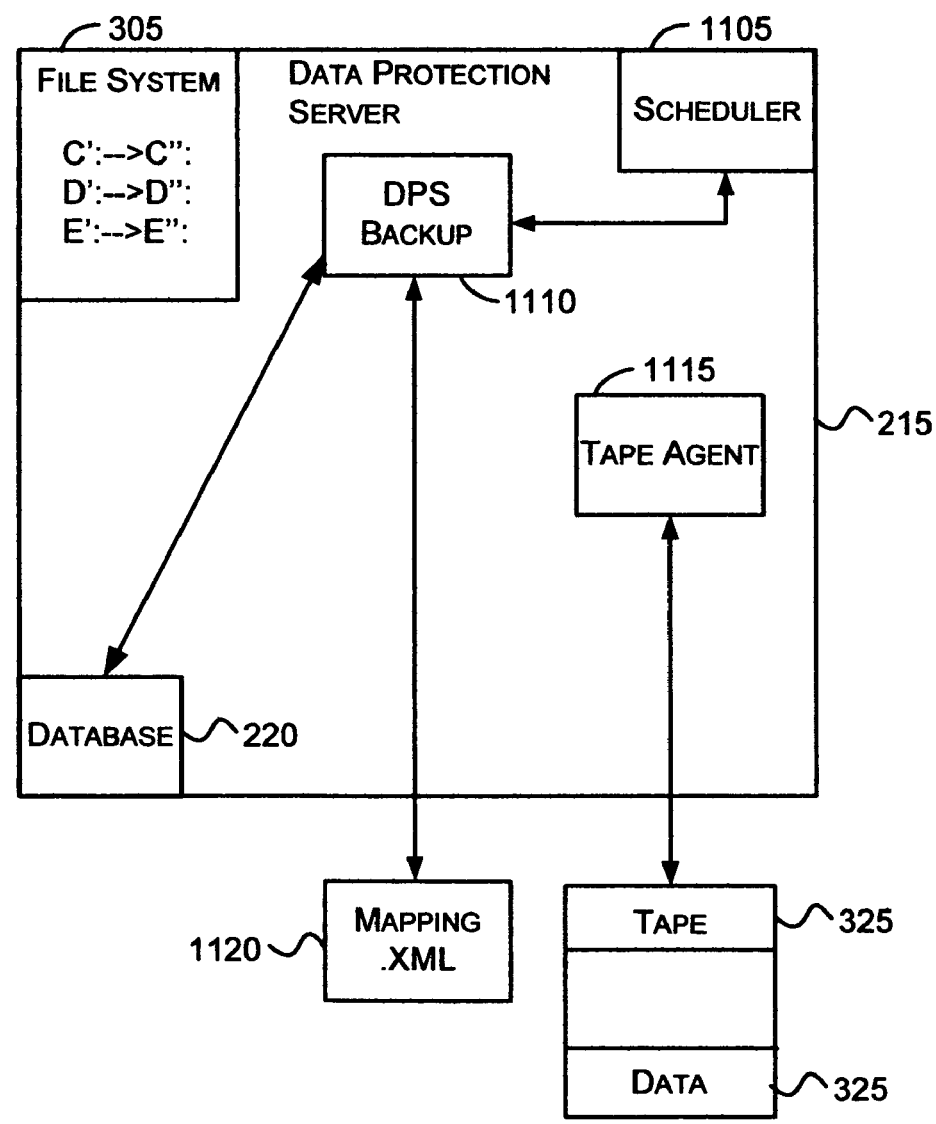
FIG. 11 is a block diagram representing another exemplary arrangement of components of an environment in which the present invention may operate in accordance with various aspects of the invention.

FIG. 11 is a block diagram representing another exemplary arrangement of components of an environment in which the present invention may operate in accordance with various aspects of the invention. In this environment, the components are arranged to operate such that VSS components are not needed to perform backups.

Periodically, a scheduler 1105 instructs a DPS backup utility 1110 (which may comprise a VSS Requestor) to create shadow copies of volumes of the file system 305 that correspond to production server volumes. The DPS backup utility 1110 obtains mappings of production server volumes to data protection server volumes via the database 220. For example, production server volumes may map to C', D', and E' on the data protection server. The DPS backup utility 1110 may create shadow copies C", D", and E" which correspond to C', D', and E', respectively.

Thereafter, the tape agent 1115 may backup the shadow copies C", D", and E" to a tape 325. The tape agent 1115 may be scheduled to perform backups of known shadow copy volumes on a periodic basis (e.g., shortly after the scheduler 1105 instructs the DPS backup utility 1110 to create shadow copies).

In one embodiment, the DPS backup utility 1110 may provide a mapping document 1120 that may be read by the tape agent 1115. In this embodiment, the tape agent 1115 may store the mapping document or mappings derived therefrom to the tape 325.

In another embodiment, the DPS backup 1110 may not provide a mapping document 1120. In this embodiment, the tape agent 1115 may or may not store mappings to the tape 325. If the tape agent 1115 does store mappings, such mappings may need to be created manually as the tape agent 1115 may not have access to the database 220. Without the mappings document stored on the tape 325, restoring data to the data protection server 1105 or a production server may involve user interaction in determining which volumes stored on the tape 325 should be restored to which volumes on the target machine.

As can be seen from the foregoing detailed description, there is provided a method and system for backing up and restoring data. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer program product for implementing a method for backing up and restoring data, the computer program product comprising one or more recordable-type computer-readable storage media having stored thereon computer-executable instructions that, when executed by one or more processors of the computing system, cause the computing system to perform the method, the method comprising:

maintaining a first mapping that maps files stored in a first volume of a first computer in a first filing format to files stored in a second volume of a second computer in a second filing format, the first mapping including a plurality of mapping information portions, wherein at least one of the portions includes proprietary mapping information and at least one of the portions includes public mapping information indicating which files of the first volume have been mapped to files of the second volume, wherein the second volume stores a copy of one or more data files of the first volume in a second filing format different than the first filing format used to store files in the first computer, wherein the copy is updated as the data files of the first volume are updated;

backing up data files of the second volume to a storage library in a manner so as to appear as to have come directly from the first computer, the backing up comprising storing the data files according to the first filing format of the first computer as indicated by the public mapping information, together with the mappings between the data files of the first volume of the first computer and the data files of the second volume of the second computer;

restoring one or more data files from the storage library to the first volume of the first computer using the first filing format such that files of the first computer are directly restorable from the storage library without accessing the files or mappings of the second computer;

taking a snapshot of the first volume of the first computer, wherein the snapshot is viewed as a separate volume by the first computer operating system and any executing applications;

maintaining a second mapping that maps the snapshot to the second volume on the second computer;

backing up the snapshot on the second volume according to the second mapping using a proprietary format, the second mapping including an indication of which first computer system volumes are backed up on the second server;

backing up the snapshot stored on the second volume to a third computer system using a public format, such that, in each instance where a difference between the proprietary format and the public format is detected, a file mapping change is inserted; and restoring at least some portions of data from the snapshot to at least one of the first computer according to the proprietary format and the second computer using the public format.

2. The recordable-type computer-readable medium of claim 1, further comprising reallocating the first volume if the first volume no longer exists on the first computer.

3. The recordable-type computer-readable medium of claim 1, further comprising:

reading the mapping from the storage library; and
   determining if the first volume is currently mapped to the second volume in a database included on the second machine.

4. The recordable-type computer-readable medium of claim 3, further comprising failing a restore request if the first volume is not currently mapped to the second volume in the database.

5. The recordable-type computer-readable medium of claim 1, wherein restoring one or more data files from the storage library to the first volume of the first computer comprises restoring in response to an event comprising a crash of the second computer or data corruption occurring on the second computer.

6. The recordable-type computer-readable medium of claim 1, further comprising restoring the data to the first computer by performing acts, comprising:

reading data including the mapping from the storage library; and
   checking the integrity of the data including the mapping.

7. The recordable-type computer-readable medium of claim 6, further comprising:

selecting data corresponding to a third volume from the storage library to restore to the first computer; and
   determining whether the third volume maps to a volume on the first computer via the mapping and failing a request to restore the third volume if the third volume does not map to a volume on the first computer.

8. The recordable-type computer-readable medium of claim 1, wherein the mapping comprises a tuple including identifiers that identify the first and second computers and the first and second volumes.

9. The recordable-type computer-readable medium of claim 1, further comprising providing a proprietary formatted document that includes the mapping and a document in a publicly-available format that includes the mapping.

10. A method for backing up and restoring data, comprising:

creating a shadow copy of files stored in a second volume of a second computer in a second filing format, wherein the second volume of the second computer stores a copy of data files stored in a first volume of a first computer in a first filing format in the second different filing format, the shadow copy including a first mapping that maps files stored in the first volume of the first computer in the first filing format to files stored in the second volume of the second computer in the second filing format, the first mapping including a plurality of mapping information portions, wherein at least one of the portions includes proprietary mapping information and at least one of the portions includes public mapping information indicating which files of the first volume have been mapped to files of the second volume;

backing up the shadow copy to one or more storage media in a manner so as to appear as to have come directly from the first computer, the backing up comprising storing the data files according to the first filing format of the first computer as indicated by the public mapping information; and restoring one or more data files from the shadow copy on the storage media to the first volume of the first computer using the shadow such that files of the first computer are directly restorable from the storage media without accessing the shadow copy of the second computer;

taking a snapshot of the first volume of the first computer, wherein the snapshot is viewed as a separate volume by the first computer operating system and any executing applications;

maintaining a second mapping that maps the snapshot to the second volume on the second computer;

backing up the snapshot on the second volume according to the second mapping using a proprietary format, the second mapping including an indication of which first computer system volumes are backed up on the second server;

backing up the snapshot stored on the second volume to a third computer system using a public format, such that, in each instance where a difference between the proprietary format and the public format is detected, a file mapping change is inserted; and restoring at least some portions of data from the snapshot to at least one of the first computer according to the proprietary format and the second computer using the public format.

11. The method of claim 10, wherein creating the shadow copy is performed according to instructions by a scheduler, wherein backing up the shadow copy to storage media is performed by a backup agent, and wherein the backup agent does not make a request to the scheduler before backing up the shadow copy to the storage media.

12. The recordable-type computer-readable medium of claim of claim 1, wherein backing up the data files stored in the second volume of the second computer in the second filing format in a manner so as to appear as to have come directly from the first computer comprises inserting the filing path of the first filing format for each data file backed up from the second volume.

13. The method of claim 1, wherein the snapshot includes a volume name, drive letter and a mount point.

14. The method of claim 1, wherein the mapping is maintained by Visual Snapshot Service (VSS), wherein VSS includes a plurality of writers, each writer being associated with a corresponding application, each writer being configured to ensure that at the time a snapshot is created, the corresponding application's data is crash consistent.

15. The method of claim 14, wherein the writers are configured to indicate to the third computer where the application's data resides on disk and which files include the application's data.

16. The method of claim 15, further comprising:
accessing the writers to determine which application components are to be accessed; and
based on the determination, identifying which volumes are to be copied in a snapshot.

17. The recordable-type computer-readable medium of claim 1, further comprising checking the validity of the mappings, the checking comprising ensuring that data files in backed up volumes still exist and have the same semantic meaning.

18. A computer system comprising the following:
one or more processors;
system memory;
one or more computer-readable storage media having thereon computer-executable instructions that, when executed by the one or more processors, causes the computing system to perform a method for providing a client-side authentication service that allows seamless access to datacenter-provided information corresponding to various client-side applications, the method comprising the following:
an act of an act of maintaining a first mapping that maps files stored in a first volume of a first computer in a first filing format to files stored in a second volume of a second computer in a second filing format, the first mapping including a plurality of mapping information portions, wherein at least one of the portions includes proprietary mapping information and at least one of the portions includes public mapping information indicating which files of the first volume have been mapped to files of the second volume, wherein the second volume stores a copy of one or more data files of the first volume in a second filing format different than the first filing format used to store files in the first computer, wherein the copy is updated as the data files of the first volume are updated;
an act of backing up data files of the second volume to a storage library in a manner so as to appear as to have come directly from the first computer, the backing up comprising storing the data files according to the first filing format of the first computer as indicated by the public mapping information, together with the mappings between the data files of the first volume of the first computer and the data files of the second volume of the second computer;
restoring one or more data files from the storage library to the first volume of the first computer using the first filing format such that files of the first computer are directly restorable from the storage library without accessing the files or mappings of the second computer;
taking a snapshot of the first volume of the first computer, wherein the snapshot is viewed as a separate volume by the first computer operating system and any executing applications;
maintaining a second mapping that maps the snapshot to the second volume on the second computer;
backing up the snapshot on the second volume according to the second mapping using a proprietary format, the second mapping including an indication of which first computer system volumes are backed up on the second server;
backing up the snapshot stored on the second volume to a third computer system using a public format, such that, in each instance where a difference between the proprietary format and the public format is detected, a file mapping change is inserted; and
restoring at least some portions of data from the snapshot to at least one of the first computer according to the proprietary format and the second computer using the public format.

* * * * *